United States Patent [19]

Matson

[11] Patent Number: 4,734,976

[45] Date of Patent: Apr. 5, 1988

[54] METHOD OF MAKING A VOID-FREE INSULATED ELECTROMAGNETIC COIL

[75] Inventor: Thomas J. Matson, Erie, Pa.

[73] Assignee: General Electric Company, Erie, Pa.

[21] Appl. No.: 915,465

[22] Filed: Oct. 6, 1986

[51] Int. Cl.⁴ .............................................. H02K 3/40
[52] U.S. Cl. ....................................... 29/606; 29/607; 156/53; 156/185
[58] Field of Search ................. 29/596, 598, 605, 606, 29/607; 156/53, 48, 56, 185; 310/45, 208; 336/209

[56] References Cited

U.S. PATENT DOCUMENTS

| | | | |
|---|---|---|---|
| 2,195,233 | 3/1940 | Boyer | 175/21 |
| 3,033,727 | 5/1962 | Cram et al. | 156/5.6 |
| 3,297,970 | 1/1967 | Jones | 336/205 |
| 3,600,801 | 8/1971 | Larsen et al. | 29/605 |
| 4,400,226 | 8/1983 | Horrigan | 156/56 |

*Primary Examiner*—Timothy V. Eley
*Attorney, Agent, or Firm*—Albert S. Richardson, Jr.

[57] ABSTRACT

A method of insulating a field coil of an electric traction motor, comprising the steps of encapsulating the coil in flexible ground insulation, temporarily mounting the insulated coil on a field pole piece, wrapping heat shrinkable material around the perimeter of the insulated coil, said material being so composed, oriented, and applied as to shrink irreversibly, when subsequently heated, in a direction tending to constrict the whole outside perimeter of the insulated coil, attaching the base of the pole piece to a concave surface of the magnet frame of the motor in a manner that compactly clamps the coil between the frame and an overhanging distal end of the pole piece, heating the perimeter wrap so that it shrinks appreciably and tightly binds the underlying ground insulation, thereby counteracting any tendency of the ground insulation to become slack on the outside of the coil when the coil was clamped in place, and filling any remaining voids inside the ground insulation with varnish or resin in a conventional vacuum impregnation process.

8 Claims, 2 Drawing Sheets

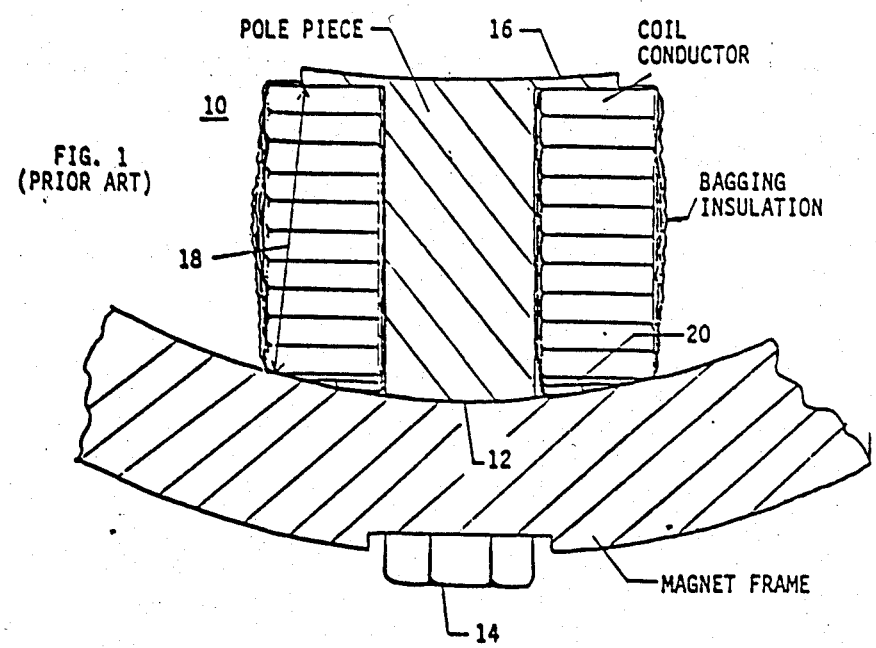
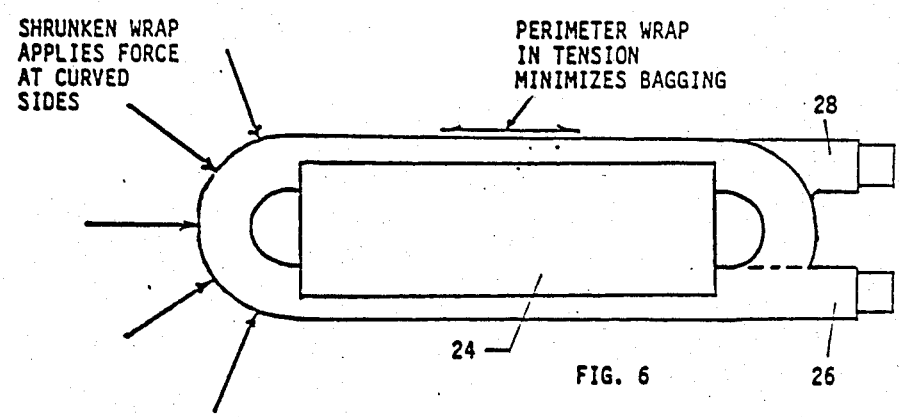
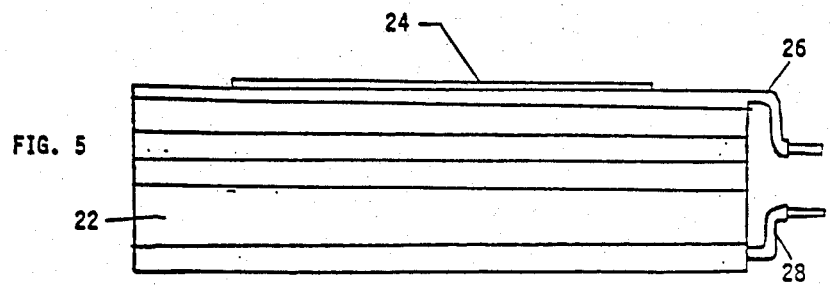

METHOD OF MAKING A VOID-FREE INSULATED ELECTROMAGNETIC COIL

BACKGROUND OF THE INVENTION

This invention relates to a new and improved method of insulating electromagnetic coils, and it relates more particularly to a method of forming virtually void-free ground insulation around helical multi-turn coils such as used on the exciting and commutating field poles of a large direct current (d-c) motor.

In a large d-c motor, such as those used in the electrical propulsion systems of rapid transit cars, a plurality of field coils are respectively mounted on salient pole pieces that extend radially inwardly from the cylindrical magnet frame or stator of the motor. Each of these coils comprises a long copper conductor of relatively large cross-sectional area (e.g. one-quarter square inch) that has been wound or bent to form a plurality of juxtaposed turns (e.g. 17 turns). Typically the copper conductor has a rectangular cross-section and is wound edgewise, i.e. the wider side of the conductor is perpendicular to the centerline of the coil. The resulting multi-turn coil has an oblong helical shape, and its open center or "window" is appropriately dimensioned to fit around the associated pole piece which has a generally rectangular cross-section. The terminal sections of the copper conductor at opposite ends of the coil serve as relatively flexible leads that are connected via interconnection straps and external cables to a source of unidirectional electric current, and when energized or excited by such current the coil produces a desired magnetic field inside the motor.

Between adjacent turns of the field coil suitable insulating material is disposed so as to prevent turn-to-turn electrical short circuits, and the exposed surfaces of the whole stack of helical turns are encapsulated in such material to insulate the coil from the grounded pole piece and frame of the motor. The insulating system preferably is characterized by high dielectric strength, good heat transfer properties, both physical and chemical stability at elevated temperatures, and a high resistance to moisture and dirt. The heat transfer properties are particularly significant in traction motors where the goal is to obtain more output torque per unit of weight by increasing the current density (and hence the heat generated) in the coils.

Any air pockets or "voids" inside the insulating system will impede heat transfer and are therefore undesirable. After applying ground insulation to a field coil, assembling the coil on its pole piece, and bolting the pole piece inside the magnet frame of the motor, small voids have been discovered in the ground insulation. Such voids are caused by a tendency of the insulation to be slack or "baggy" on the outside of the coil. The bagginess may be the result of somewhat stiff ground insulation that does not closely conform to the contour of the stack of helical turns, and it is aggravated by the reduction in coil height that takes place when the pole piece is fastened to the frame and the turns of the coil are tightly clamped together between the frame and the overhanging head of the pole piece. It is difficult to completely fill the voids with varnish or resin during the vacuum-pressure impregnation (VPI) process that is conventionally used to improve the heat transfer and moisture-resistance properties of motor insulating systems.

The VPI treatment and its advantages are well known to persons skilled in the art of insulating coils and windings of electrical machines. Typically this process is executed after the field coil-pole piece subassemblies have been installed in the magnet frame and the frame has been pre-baked to dry out the insulating system. The basic steps of a VPI process comprise: placing the pre-baked frame in a sealed empty tank, drawing a vacuum to expel air from the interstices of the coil turns and insulating system, pumping enough flowable, solventless varnish into the tank to cover the coils, removing the vacuum, pressurizing the tank to force the varnish to penetrate the insulating system and fill the voids therein and any air spaces around and between the turns of the coil, draining the varnish from the tank which is then vented to atmospheric pressure, and baking the frame in an oven until the varnish cures. The amount of varnish that the insulating system retains depends on several factors, including the number and size of the voids. If the voids initially have too great a magnitude, as can result from the above-mentioned bagging of the ground insulation, they will not be totally filled with varnish during a commercially practical VPI process.

U.S. Pat. No. 3,600,801—Larsen et al discloses a motor coil of the random-wound type wherein multiple turns of magnet wire are rather loosely bundled in a coil to be encapsulated in ground insulation. In order to compress the bundle of wires and force varnish into the voids between adjacent turns, the bundle is encircled by a spirally wrapped heat-shrinkable polymeric tape which will shrink when subsequently heated during the VPI process. The tape is applied by "skip-taping" so as to leave space between its adjacent turns for varnish to permeate the coil. The ground insulation is applied later. In any event, the spirally wrapped heat-shrinkable tape would not be very effective to prevent the above-mentioned bagging of ground insulation on the outside of the coil because there is relatively little shrinkage in that region.

U.S. Pat. No. 3,297,970—Jones discloses a transformer coil covered with a sheet of glass cloth impregnated with a semi-cured (B stage) polyester resin that requires heat and pressure for final curing. Before being so covered, the coil was given a VPI treatment to impregnate the interstices between its turns with varnish, and afterwards the coil is encapsulated in a heat-shrinkable wrapping that applies pressure on the underlying cover when subsequently heated to the curing temperature of the resin.

SUMMARY OF THE INVENTION

A general objective of the present invention is to provide an improved method of insulating multi-turn field coils in large electric motors, which method includes a relatively simple yet effective step that materially reduces voids in the ground insulation around the coil before it is given the conventional VPI treatment.

The improved insulating method is suitable for forming virtually void-free ground insulation around an oblong helical electromagnetic coil having a plurality of turns encircling a generally rectangular pole piece the base of which is firmly anchored to a concave surface of a magnet frame of a round electric motor. The distal end of the pole piece is wider than the window in the coil, and it overhangs, respectively, the two relatively long, straight sides of the coil. The shortest distance from the concave surface of the frame to the overhanging distal end of the pole piece is less than the freestanding height of the coil and its ground insulation, whereby the coil turns are clamped in compression between the concave surface and the distal end as the pole piece is bolted to the frame.

In carrying out the invention in one form, the method comprises the steps of: placing filler means next to each of the long, straight sides of the end turn of the coil that will be located closest to the the magnet frame, each filler means having a tapered cross-section so that it will generally conform to the concave surface of the frame; covering the coil and filler means with suitable flexible material (e.g. two layers of "mica-mat" tape and an added layer of glass fiber tape that serves as protective armor) to provide the required electrical insulation between ground and any of the coil turns; temporarily mounting the insulated coil on the pole piece with the aid of potting compound that fills the spaces therebetween; wrapping heat-shrinkable material around only the perimeter of the insulated coil, this perimeter wrap being so composed, oriented and applied as to shrink permanently, when subsequently heated, in a direction tending to constrict the whole outside perimeter of the insulated coil; bolting the base of the pole piece to the concave surface of the magnet frame so as to clamp the coil between the concave surface and the overhanging distal end of the pole piece and thereby reduce the height of the insulated coil; heating the perimeter wrap to a temperature that causes it to shrink appreciably, whereupon the wrap will become taught and tightly bind the underlying ground insulation so as to counteract any tendency of the ground insulation to be slack due to the height of the coil being reduced during the step of fastening the pole piece to the magnet frame; and filling any remaining air spaces inside the ground insulation and between the insulated coil and the pole piece with solventless varnish or resin in a VPI process during which the varnish can readily penetrate the armor tape in regions not underlying the perimeter wrap.

The required ground insulation between the sides of the pole piece and the surrounding coil is provided by the insulating material with which the coil is covered in the second step of the above-summarized method, and the perimeter wrap is not applied in this region. The perimeter wrap is applied to the exterior of the insulated coil for the sole purpose of eliminating or at least significantly reducing ground insulation bagging which heretofore has resulted in undesirable internal voids that are difficult to fill with varnish during the VPI process.

In practicing the invention in its presently preferred form, the perimeter wrap comprises heat-shrinkable material known generically as polyimide film, and it is manufactured and sold by the DuPont Company under the trademark "Kapton." Thin gauge Kapton insulation has a relatively high dielectric strength and remains stable at elevated temperatures. It can be coated with Teflon [reg. TM] FEP-fluorocarbon resin to provide a heat-sealable surface on the base of polyimide film. When a strip or tape of such material is briefly heated to a temperature of 125° C. to 150° C. and pulled in its long direction, it can be pre-stretched up to 10% in length. But once reheated the pre-stretched Kapton tape will relax and shrink irreversibly to its original length.

In U.S. Pat. No. 4,400,226, Horrigan disclosed and claimed a method for encapsulating the helical turns of a field coil in FEP resin-coated polyimide tape to provide the requisite ground insulation. The Horrigan disclosure is expressly incorporated herein by reference. Horrigan suggested using pre-stretched tape so that it would irreversibly shrink and tightly adhere to the coil upon subjecting the coil to heat and pressure in order to melt the FEP resin and seal the ground insulation. This will happen before the coil height is reduced by bolting its pole piece to the magnet frame.

In another known method of applying ground insulation to field coils, after the stack of helical turns is wrapped in mica-mat tape but before the armor tape is added, a binding tape is placed around the "belly" of the coil to restrain the mica-mat tape in regions where it would otherwise tend to bulge out. Such prior art binding tape is not heat-shrinkable, and it does not prevent later bagging of the ground insulation due to the reduction in coil height as the associated pole piece is bolted to the magnet frame.

The present invention will be better understood and its various objectives and advantages will be more fully appreciated from the following description taken in conjunction with the accompanying drawings.

BRIEF DESCRIPTION OF THE DRAWINGS

FIG. 1 is a simplified cross-sectional view of a prior art commutating field coil mounted on its pole piece which is bolted to the magnet frame of an electric motor;

FIG. 5 is a reduced-scale side elevation of a field coil and pole piece subassembly installed in a motor, the coil having been insulated in accordance with the improved method of FIG. 2; and FIG. 6 is a plan view of the coil-pole piece subassembly shown in FIG. 5.

DETAILED DESCRIPTION OF THE INVENTION

Figure 2:
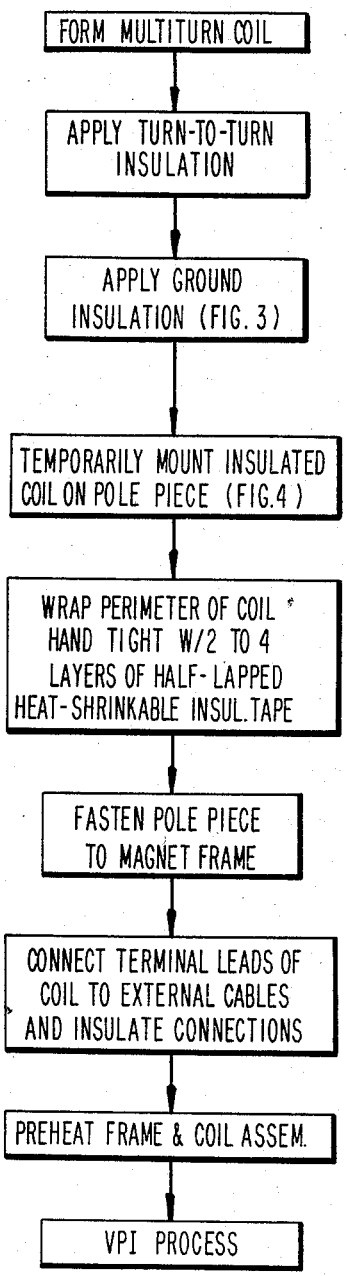
FIG. 2 is a flow chart outlining the steps of an improved method for insulating a motor field coil.

A section of a prior art helical electromagnetic coil 10 is shown in FIG. 1. To make this coil, a bare copper conductor or strap of rectangular cross-section is wound in an edge-wise fashion to form a plurality of serially connected turns. Suitable electrical insulation is inserted between adjoining turns of the coil conductor, and the whole stack of turns is then encapsulated in flexible ground insulation. The coil turns have a generally oblong configuration so that a field pole piece of rectangular cross-section will fit through the window of the insulated coil. The pole piece is made of laminations of magnetizable material, and its base 12 is anchored to a concave surface of the magnet frame (i.e., the stator) of an electric motor. As is shown in FIG. 1, a bolt 14 is conventionally used to fasten the pole piece to the frame.

The head or distal end 16 of the pole piece (i.e., the end that is separated by a relatively small air gap from the rotating armature of the motor) is laterally flared so that it is wider than the window in the coil and overhangs, respectively, the two relatively long, straight sides of the coil. Consequently the coil is captured between the pole head 16 and the magnet frame. No clamping spring is used between pole head and coil. In practice the insulated coil is sized so that its freestanding height exceeds by a predetermined amount the shortest distance 18 from the concave surface of the frame to the overhanging distal end of the pole piece. As a result, the coil turns and insulating system are compressed as the bolt 14 is tightened to firmly clamp the coil in place, and there is a controlled reduction in the coil height. By way of example, a field coil is typically so compressed that its height is reduced approximately one percent upon fastening the pole piece to the concave surface of the frame. In operation, the coil experiences thermal cycling that causes its conductor to expand and to contract, and it must be clamped to the frame with sufficient force so that these dimensional changes will be absorbed by the flexible insulating system and no harmful chafing will take place between the sides of the pole piece and the surrounding ground insulation of the coil.

As was explained hereinbefore, the reduction in height of prior art field coils has caused the outside of the ground insulation to become extra slack or baggy. A slightly exaggerated view of the bagging insulation is included in FIG. 1. The air spaces or voids that form under the bagging region of the ground insulation are difficult to fill with varnish during a commercially practical VPI process.

An improved method of making a motor field coil having virtually void-free insulation will now be described with reference to FIG. 2. The first step is to form a multi-turn helical coil from a copper conductor by conventional means. In the second step, the required turn-to-turn insulation is applied by dipping the coil in flowable varnish, inserting thin pieces of suitable insulating material (e.g., unfired aluminum silicate inorganic multi-cylinder paper) between adjoining turns, clamping the turns together, and baking the coil until the varnish gels or cures. Next the coil is encapsulated in flexible ground insulation by following the steps described in more detail in FIG. 3.

Figure 3:
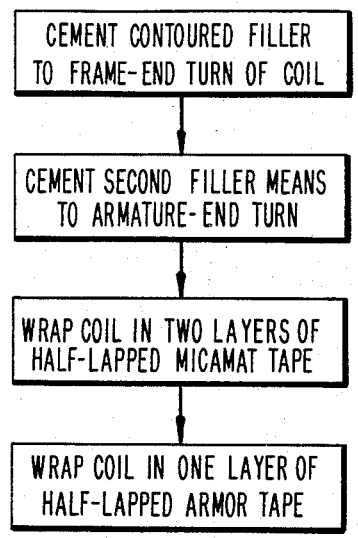
FIGS. 3 and 4 are expanded flow charts of two of the steps represented by single blocks in the FIG. 2 chart.

As is indicated in FIG. 3, first filler means is positioned next to each of the two relatively long, straight sides of the frame-end turn of the coil where it is cemented in place, and second filler means is positioned next to each long, straight side of the armature-end turn where it is similarly cemented in place. These filler means, which typically comprise strips or pads of flexible, unfired ceramic paper sold under the trade name Cequin, serve to protect the pressure points of the coil from mechanical damage and to accommodate variations in the thickness of the coil conductor from one batch of coils to another. Each of the first filler means has a tapered cross-section so that it will generally conform to the concave surface of the magnet frame when the coil-pole piece subassembly is later installed in the frame. This can be done in any one of a variety of known ways. For example, as is illustrated by reference No. 20 in FIG. 1, two pairs of Cequin pads of different widths can be disposed in underlapping fashion on the frame-end turn. Alternatively, a single pad plus a contoured aluminum filler can be used. The second filler means is a pad of proper thickness to give the coil its desired overall freestanding height.

After the filler pads have been cemented in place, the coil is spirally wrapped in two layers of half-lapped mica-mat tape. This tape is made from reconstituted mica paper which has the required strength and ability to withstand electrical flashovers to ground. Its thermal rating is compatible with the temperature rise limit of Class H insulation as specified in industry standards for rotating electric machinery for rail vehicles.

After covering the coil and filler means with the mica-mat tape, a single layer of spirally-wrapped armor tape is applied in half-lap fashion, i.e., each turn of the tape overlaps approximately half the width of the preceding tape turn. The armor tape, which typically is made from glass fiber cloth, protects the mica-mat tape from damage during subsequent handling and when sliding the pole piece into the window of the coil. The combination of mica-mat and armor tapes will provide the required electrical insulation between the pole piece (at ground potential) and any of the coil turns. Being somewhat stiff, however, these tapes do not readily conform to the contour of the underlying helical coil.

Figure 4:
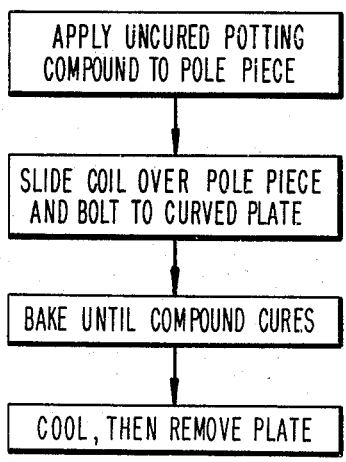

Returning now to FIG. 2, the next step of the illustrated method is temporarily to mount the insulated coil on a pole piece. FIG. 4 is an expanded outline of this step. After the pole piece is smeared with an uncured potting compound, it is inserted into the window of the insulated coil and is then bolted to a curved metal plate that simulates the concave surface of the magnet frame. Preferably the potting compound is a putty-like substance made by mixing uncured varnish and a filler, and it fills all the spaces between the pole piece and the surrounding ground insulation. This subassembly is baked to cure the potting compound, after which it is cooled and the plate is removed.

Returning again to FIG. 2, the next step of the improved method is to wrap two to four layers of half-lapped heat-shrinkable insulating tape around the perimeter of the insulated coil. Only the perimeter is so wrapped; this tape is not applied over the regions of the ground insulation that cover the filler means at opposite ends of the coil. The heat-shrinkable tape is so composed and oriented as to shrink permanently, when subsequently heated, in a direction tending to constrict the whole outside perimeter of the insulated coil. Three layers of pre-stretched polyimide film such as Kapton are presently preferred for this purpose, with each layer comprising from two to five half-lapped turns of Kapton tape. The Kapton tape is uncoated, and it is stretched approximately 7 to 10% at an elevated temperature prior to being wrapped hand tight around the perimeter of the insulated coil. The loose end of the tape is secured by a piece of pressure sensitive Kapton tape that is sticky on one side.

Alternatively, the above-described perimeter wrapping step can be executed just before or during the preceding step of temporarily mounting the insulated coil on the pole piece (FIG. 4).

After applying the perimeter wrap, the coil-pole piece subassembly is tightly bolted to the concave surface of the magnet frame, thereby clamping the coil between the frame and the over-hanging distal end of the pole piece and reducing the height of the coil as previously explained. Most of the height reduction will actually occur in the flexible filler pads and their overlying ground insulation. As is indicated in FIG. 2, after the pole piece is fastened to the frame the next step is to connect external straps and/or cables to the terminal leads at opposite ends of each coil and then wrap the connections in insulating tape.

Next the magnet frame is preheated in an oven to evaporate moisture from the coil assemblies and their insulating systems. This step is typically carried out at 150° C. for approximately four hours. Such temperature and time are sufficient to cause appreciable and irreversible shrinkage of the perimeter wrap in a direction parallel to the long dimension of the coil conductor. The shrunken perimeter wrap is very taught, like a strong rubber band. In this state it tightly binds the underlying ground insulation to an extent that counteracts the tendency of the ground insulation to "bag"

when initially applied and later when the pole piece was fastened to the magnet frame, thereby materially reducing the magnitude of voids in the insulating system. Note that if the perimeter wrap were applied before temporarily mounting the pole on the pole piece (FIG. 4), it would have experienced at least some shrinkage when the potting compound was being cured, and the shrinking process would be completed during the last-mentioned preheating step.

Upon completion of the preheating step, the frame and coil assemblies are cooled and then impregnated with a catalyzed resin or varnish to fill any air spaces or voids that remain inside the ground insulation and in the interstices between the insulated coil and its pole piece. This step comprises a conventional VPI process as previously described. During the VPI process varnish can readily penetrate the exposed surfaces of the ground insulation that are not covered with the perimeter wrap, and some varnish will also migrate through the interlap joints of the perimeter wrap. Consequently, the method outlined in FIG. 2 improves the varnish fill and produces virtually void-free Class H ground insulation around the coil. After the varnish gels it remains elastic so that the entire insulating system can compress further when heated and recover when cooled during the thermal cycles that the coil will experience in operation.

The benefit of this invention is illustrated in FIGS. 5 and 6 which show a typical commutating field coil made by the method of FIG. 2. The actual height and width of this coil are approximately 2.8 inches each, and the coil length is approximately 9.7 inches. In FIGS. 5 and 6 the perimeter wrap is identified by the reference No. 22, the distal end of the field pole piece is identified by the reference No. 24, and the terminal leads of the coil's armature-end and frame-end turns are respectively identified by the reference Nos. 26 and 28. Along the outside of each of the long, straight sides of the coil the perimeter wrap 22 shrinks appreciably (e.g., up to 10% or approximately 0.8 inch) in the direction of the coil conductor, thereby becoming very taught and substantially eliminating any previous bagging of the underlying ground insulation. Around each of the curved sides of the coil the shrunken perimeter wrap applies an inwardly directed force strong enough to hold the underlying ground insulation against the coil turns and prevent any significant bagging in this region. Consequently, the novel step of applying a heat-shrinkable perimeter wrap in accordance with the present invention minimizes the size and number of voids to be filled by varnish during the ensuing VPI process. This results in a motor field coil insulating system having better heat transfer, more effective moisture resistance, and longer life.

While a preferred embodiment of the invention has been described, various other embodiments and modifications will be apparent to persons skilled in the art. The concluding claims are therefore intended to cover all such modifications as fall within the true spirit and scope of the invention.

I claim:

1. A method of forming virtually void-free ground insulation around an oblong helical electromagnetic coil having a plurality of turns encircling a generally rectangular pole piece anchored to a concave surface of a magnet frame of an electric motor, each turn of said coil having two relatively long, straight sides on opposite sides of a window through which the pole piece is inserted, said pole piece comprising a base and a distal end which is wider than said window and overhangs the straight sides of said coil turns, the shortest distance from the concave surface of said magnet frame to the distal end of said pole piece being less than the free-standing height of said coil and its ground insulation whereby said coil is clamped in compression between said concave surface and said distal end, comprising the steps of:

a. placing filler means next to each of the long, straight sides of the turn of the multi-turn helical coil that will be located closest to said magnet frame, each filler means having a tapered cross section so that it will generally conform to the concave surface of said frame;
   b. covering the coil and filler means with suitable flexible material to provide the required electrical insulation between ground and any of the coil turns;
   c. temporarily mounting the insulated coil on said pole piece;
   d. wrapping heat shrinkable material around the perimeter of the insulated coil, said material being so composed, oriented and applied as to shrink permanently, when subsequently heated, in a direction tending to constrict the whole outside perimeter of the insulated coil;
   e. fastening the base of said pole piece to the concave surface of said magnet frame so as to clamp the coil between said concave surface and the distal end of said pole piece and thereby reduce the height of the insulated coil;
   f. heating the material wrapped around the perimeter of the insulated coil to a temperature that causes appreciable shrinkage of said material, whereupon said material will become taut and tightly bind the underlying ground insulation so as to counteract any tendency of the ground insulation to be slack; and
   g. filling any remaining air spaces inside said ground insulation and between said insulated coil and said pole piece with varnish in a vacuum pressure impregnation process.

2. A method as in claim 1, in which the heat shrinkable material wrapped around the perimeter of the insulated coil comprises at least two layers of polyimide film.

3. A method as in claim 2, in which each of said layers is formed by wrapping at least two turns of half-lapped polyimide tape around only the perimeter of the insulated coil.

4. A method as in claim 1, in which the flexible ground insulating material and the heat shrinkable material have thermal ratings suitable for a Class H insulating system.

5. A method as in claim 1, in which the heat shrinkable material is not applied over the regions of the flexible ground insulating material that cover the filler means.

6. A method as in claim 1, in which the ground insulation covering the coil and filler means comprises a spirally-wrapped tape of suitable flexible material.

7. A method as in claim 6, in which said flexible material comprises mica.

8. A method as in claim 1, in which the ground insulation covering the coil and filler means comprises two layers of spirally-wrapped mica tape and one layer of spirally-wrapped glass fiber tape.

* * * * *